United States Patent
Pan et al.

(10) Patent No.: US 11,853,721 B2
(45) Date of Patent: Dec. 26, 2023

(54) INTERRUPT-DRIVEN SYSTEM VERIFICATION METHOD BASED ON INTERRUPT SEQUENCE DIAGRAM

(71) Applicant: NANJING UNIVERSITY, Jiangsu (CN)

(72) Inventors: Minxue Pan, Jiangsu (CN); Shouyu Chen, Jiangsu (CN); Tian Zhang, Jiangsu (CN); Linzhang Wang, Jiangsu (CN); Xuandong Li, Jiangsu (CN)

(73) Assignee: NANJING UNIVERSITY, Jiangsu (CN)

( * ) Notice: Subject to any disclaimer, the term of this patent is extended or adjusted under 35 U.S.C. 154(b) by 0 days.

(21) Appl. No.: 17/616,855

(22) PCT Filed: Jul. 17, 2019

(86) PCT No.: PCT/CN2019/096256
§ 371 (c)(1),
(2) Date: Dec. 6, 2021

(87) PCT Pub. No.: WO2020/244028
PCT Pub. Date: Dec. 10, 2020

(65) Prior Publication Data
US 2022/0317976 A1    Oct. 6, 2022

(30) Foreign Application Priority Data
Jun. 4, 2019 (CN) .......................... 201910480184.9

(51) Int. Cl.
G06F 8/10 (2018.01)
(52) U.S. Cl.
CPC ...................................... G06F 8/10 (2013.01)
(58) Field of Classification Search
CPC ................................. G06F 8/10; G06F 81/10
(Continued)

(56) References Cited

U.S. PATENT DOCUMENTS 4,933,836 A * 6/1990 Tulpule ............... G06F 15/8023
712/12
5,247,628 A * 9/1993 Grohoski .............. G06F 9/3885
712/214
(Continued)

FOREIGN PATENT DOCUMENTS

CN      104375842 A    2/2015
CN      106648617 A    5/2017

OTHER PUBLICATIONS

Sung et al., "Modular Verification of Interrupt-Driven Software", IEEE, pp. 206-216 (Year: 2017).*
(Continued)

*Primary Examiner* — Anil Khatri
(74) *Attorney, Agent, or Firm* — Muncy, Geissler, Olds & Lowe

(57) ABSTRACT

An interrupt-driven system verification method based on interrupt sequence diagrams includes the steps of: establishing an interrupt-driven system model based on an interrupt sequence diagram, dividing interaction fragments in the obtained interrupt sequence diagram into basic interaction fragments and composite interaction fragments and sequentially converting the basic interaction fragments and the composite interaction fragments into the corresponding automaton models, combining the automaton models into one automaton model, adding the constraints in the interrupt sequence diagram to the converted automaton model, adding the verification attribute information as a constraint to the converted automaton model, describing an automaton as an input format acceptable to the automaton verification tool, and verifying the model with the automaton verification tool.

9 Claims, 7 Drawing Sheets

(58) Field of Classification Search
USPC .................................................. 717/104–128
See application file for complete search history.

(56) References Cited

U.S. PATENT DOCUMENTS

| | | | | | |
|---|---|---|---|---|---|
| 5,437,553 | A * | 8/1995 | Collins | ................... | G09B 7/04 |
| | | | | | 434/323 |
| 5,592,674 | A * | 1/1997 | Gluska | ................ | G06F 11/2231 |
| | | | | | 714/E11.166 |
| 5,790,871 | A * | 8/1998 | Qureshi | .............. | G06F 11/2231 |
| | | | | | 702/123 |
| 5,931,934 | A * | 8/1999 | Li | ........................ | G06F 9/4812 |
| | | | | | 360/32 |
| 6,006,028 | A * | 12/1999 | Aharon | ............... | G06F 11/3684 |
| | | | | | 707/999.1 |
| 6,684,359 | B2 * | 1/2004 | Noy | ............... | G01R 31/318342 |
| | | | | | 714/33 |
| 6,751,582 | B1 * | 6/2004 | Andersen | ........... | G06F 30/3323 |
| | | | | | 703/2 |
| 6,986,110 | B1 * | 1/2006 | Thompson | ..... | G01R 31/318357 |
| | | | | | 707/999.005 |
| 7,058,557 | B2 * | 6/2006 | Lin | ................ | G01R 31/318364 |
| | | | | | 716/136 |
| 7,137,100 | B2 * | 11/2006 | Iborra | ...................... | G06F 8/30 |
| | | | | | 717/109 |
| 7,171,281 | B2 * | 1/2007 | Weber | ................... | G05B 15/02 |
| | | | | | 700/20 |
| 7,941,299 | B1 * | 5/2011 | Aldrich | ..................... | G06F 8/34 |
| | | | | | 703/2 |
| 9,038,015 | B1 * | 5/2015 | Allsbrook | ................ | G06F 8/30 |
| | | | | | 717/102 |
| 9,256,485 | B1 * | 2/2016 | Moore | .................... | G06F 9/546 |
| 9,329,840 | B1 * | 5/2016 | Koh | ........................ | G06F 8/34 |
| 10,585,650 | B1 * | 3/2020 | Dowe | ...................... | G06F 8/35 |
| 2010/0299470 | A1 | 11/2010 | Uno | | |
| 2011/0083124 | A1 * | 4/2011 | Moskal | .................... | G06F 8/43 |
| | | | | | 717/126 |
| 2015/0100942 | A1 * | 4/2015 | Misbhauddin | ........... | G06F 8/20 |
| | | | | | 717/104 |

OTHER PUBLICATIONS

Feng, "A Program Verification based Approach to Find Data Race Vulnerabilities in Interrupt-driven Program", IEEE, pp. 1361-1363 (Year: 2020).*

Pan et al, "Easy Modelling and Verification of Unpredictable and Preemptive Interrupt-driven Systems", IEEE, pp. 212-222 (Year: 2019).*

Wang et al., "Automatic Detection and Validation of Race Conditions in Interrupt-Driven Embedded Software", ACM, pp. 113-124 (Year: 2017).*

Brylow et al, "Static Checking of Interrupt-driven Software", IEEE, pp. 47-56 (Year: 2001).*

Hou et al, "Performance Evaluation for Interrupt-Driven Embedded Software Based on EDSPN", IEEE, 5178-5189 (Year: 2017).*

Jiang Chen, "Design, Implementation, and Verification of Interrupt System in VTOS," Chinese Master's Degree Thesis Full-Text Database (Electronic Journal), Dec. 31, 2013, sections 1.1 and 4.3, _ pages.

* cited by examiner

INTERRUPT-DRIVEN SYSTEM VERIFICATION METHOD BASED ON INTERRUPT SEQUENCE DIAGRAM

TECHNICAL FIELD

The invention pertains to the field of software engineering, more particularly, to system design verification. The invention describes an interrupt-driven system verification method based on interrupt sequence diagrams. The designers of interrupt-driven systems can use this method to describe and verify the interrupt-driven system simply and intuitively.

BACKGROUND ART

With the rapid development of computer technology, computer systems have been applied to all aspects of our life, and rail transit systems, the financial systems, and the medical systems have been highly computerized. Interrupt-driven systems have been widely used in operating systems with relatively limited hardware and software resources. For example, those applied in aerospace, industrial process control, etc., which, however, usually concern critical security issues. Malfunctions or failures of these systems can cause major economic losses, massive damage, and even casualties. In an interrupt-driven system, most task scheduling and processing procedures are triggered by interrupts, and real-time control, automatic processing of failures, and data transmission between devices are often implemented by interrupt-driven methods, mainly because the low overhead of interrupts are more suitable in the conditions with the relatively limited system hardware resources. In addition, the fast response of interrupts satisfy the requirements of real-time systems. Therefore, it is, critical to ensure the reliability of the interrupt-driven system.

However, it is challenging to ensure the reliability of the interrupt-driven system, mainly due to the characteristics of the interrupt. In the interrupt-driven systems, the timing of system operations is particularly complicated because of the uncertainty of interrupt occurrences and nesting of interrupts, while possible errors in the system can only be triggered according to a specific sequence of interrupts. As a result, it is challenging to detect faults such as operation timeout and data race caused by interrupts in the interrupt-driven system.

Interrupt sequence diagrams, as an extension based on UML sequence diagrams, provide interrupt combined fragments for modeling the process of interrupt tasks and defines the standard syntax and the corresponding semantics; besides, the interrupt sequence diagrams are also extended with time constraints, so the expressiveness of the models are enhanced to express the real-time requirements of the system. The interrupt-driven system models based on the interrupt sequence diagrams can intuitively display the interactions in the interrupt-driven systems and express the real-time requirements of the systems with concise time constraints. As such, easy-to-understand and intuitive graphical expressions allow the designers of the interrupt-driven systems to model interrupt-driven interaction scenarios conveniently, simply and quickly.

In terms of model verification, an automaton model is generally used in the full validation of software system based on the idea of model verification. In fact, the interrupt-driven systems based on the automaton model are disadvantageous for the designers of interrupt-driven systems to model, and the automaton models cannot directly express the interactions and real-time requirements of the systems like the sequence diagrams. For some complex system interaction scenarios, the system has a very large state space, thus it is difficult and error-prone to construct such an automaton model. In consideration of the above, it is necessary to convert the interrupt sequence diagrams into automaton models and transform the problem of verifying properties of interrupt-driven systems into the problems of determining the reachability of the node in the automata with the verification tool of the automata. Therefore, developers can conveniently and quickly model and verify the interaction scenario of the interrupt systems.

SUMMARY OF THE INVENTION

In the present invention, an interrupt sequence diagram is converted into an automaton model equivalent to the interrupt sequence diagram, so that the interrupt-driven system can be verified by using the verification tool of the automata. The invention provides a method for converting an interrupt sequence diagram model into a corresponding automaton model, thereby reducing errors in the case of directly constructing the automata and lowering the modelling cost, as well as using a verification tool of the automata directly to verify an interrupt-driven system.

To achieve the goal of the invention, the technical solution adopted by the invention is as follows: an interrupt-driven system verification method based on interrupt sequence diagrams. The solution consists of the following steps:

Step 1: constructing an interrupt-driven system model based on interrupt sequence diagrams.

Each interrupt sequence diagram consists of interaction objects, interaction fragments, constraints, verification attributes, etc. and is a two-dimensional diagram. The interaction objects are listed along a horizontal axis sequentially; each vertical axis indicates time increasing vertically downwards and is used for describing a time sequence of the interaction objects. The interaction objects are represented as lifelines, and the interactions among the objects are described as messages. The message is a communication mechanism among objects wherein a sending object sends a signal to another receiving object or several other receiving objects and an arrow is used for describing a transmission process of the message. The name of the message is marked above or below a line with the arrow, and sending and receiving events of the message have unique event names marked at a starting point and an ending point of the line with the arrow. The complex control flow in the interrupt sequence diagram is represented as combined fragments, the function of which is determined by the type of interactions. "Loop" represents a loop operation; "alt" represents an alternative operation; "opt" represents an optional operation, the same as in a UML sequence diagram; "int", however, is an additional operation of the interrupt sequence diagram to the UML sequence diagram, where a boundary of the combined fragments is also represented as a box. At an upper left corner of the int fragment a string "int" indicates that the type of the combined fragments is an interrupt operation; p indicates the priority of the interrupt; id is a name of the combined fragments of the interrupt; and "condition" is a conditional expression indicating a condition under which an interrupt occurs. The interaction events within interrupt combined fragments and an event outside the interrupt combined fragments have no temporal partially-ordered relation because when interrupts occur and get processed are uncertain. In terms of the priorities of the interrupts, an interrupt fragment with a higher priority can interrupt the execution of another interrupt fragment with a lower priority, but the interrupt fragment with a lower priority cannot interrupt the one with a higher priority. In terms of a conditional expression, if the conditional expression is evaluated to true, then the interrupt task can be triggered; otherwise, the interrupt task cannot be triggered.

Step 2, dividing the interaction fragments in the interrupt sequence diagram obtained in step 1 into basic interaction fragments and composite interaction fragments.

Step 3, converting the basic interaction fragments and the composite interaction fragments into corresponding automata, including:

1) For the basic interaction fragments, representing its basic interaction sequence as a quadruple BIS=(O, M, E, V), with O representing an interaction object set, M representing a message set, E representing an event set, and V representing a partial-ordered relationship among interaction events. From this we can obtain the set T of traces of the interaction sequence, after which we perform the transformation according to the following algorithm:

---

Algorithm 1: Converting Basic Interaction Fragments to Automaton Model

---

Input: BIS=(O, M, E, V)
Output: automaton model
1: generate an initial state node q0;
2: for each non-final state node q without an outgoing edge:
3:     obtain a set L of events from state q0 to q;
4:     for each event e belonging to the set E - L:
5:         if any event e' satisfies the condition (e', e)∈ V and e'∈ L:
6:             generate a new state node q' and a new transition (q, e, q');
7:         for any state node q"(q"≠ q'):
8:             L' := a set of all the events from state nodes q0 to q';
9:             L" := a set of all the events from state nodes q0 to q";
10:            if L' = L":
11:                combine state nodes q' and q" into one node q';
12:                update the transition (q, e, q") to (q, e, q');
13:    if there is no transition update for the state node q:
14:        mark q as the final state node;
15: output the automaton model

---

At first an initial state q0 is generated, and the set L is a set of events that occur during multiple transitions from the state q0 to a state q. Afterwards events without precedent events or whose precedent events in the set L are then selected in the set E-L to generate new transitions and states, and each set is updated iteratively until no new transitions and states are generated anymore. The nodes with the same states in the set L are merged in the process of generating the automaton, so the simplest automaton is generated.

2) For the composite interaction fragments, we generate the corresponding automaton based on the interaction sequence according to the method of converting the basic interaction fragments, wherein q0 is an initial state and qn is a final state. Then we finish the generation of the automaton depending on the different types of the combined fragments, which is implemented as follows:

21) For loop combined fragments which have the loop count at least a times and at most b times (a≤b), at first, two new position nodes q and qf are generated; meanwhile, a control variable i that increases at any state node is generated. Then the transitions $$q \xrightarrow{i<b, i:=i+1} q0 \text{ and } q \xrightarrow{i\geq b} qf$$

are generated, where a guard is used to limit the times of loops. Meanwhile an assignment operation, i.e., i:=i+1, is used for recording how many times loops have been executed and the variable i is incremented by 1 after each execution. As for the $$\text{transitions} qn \xrightarrow{i\geq a} qf \text{ and } qn \xrightarrow{i<b} q,$$

a guard i≥a indicates that the automaton can enter the state qf only after the loops have been executed for more than a times; otherwise the automaton transits to the state q. Finally the position nodes q and qf are marked as new initial state and final state of the current automaton.

22) For optional combined fragments, to indicate whether a guard g is satisfied, a new position node q is generated firstly, and the new transitions $$q \xrightarrow{g} q0 \text{ and } \xrightarrow{!g} qn$$

are added. The interactions within the optional combined interaction fragments are executed only when the guard g is satisfied; otherwise the automaton switches to the final state qn. Finally q is marked as a new initial state of the current automaton.

23) For alternative combined fragments, to indicate whether the guard g is satisfied, a new position node q is generated firstly, and the new transition from the state q to the initial state of the generated automaton is added. The interactions within the interaction fragment are executed when the guard g is satisfied; otherwise the interactions within another interaction fragment are executed. Finally q is marked as a new initial state of the current automaton.

24) For the interrupt combined fragments, the interaction events within the interrupt combined fragments and the interaction events outside the fragments have no time sequence relationship. The interrupt combined fragments are treated as an independent subsystem, and then the corresponding automaton is generated based on the interactions within the fragments.

Step 4: combining a plurality of automata obtained in step 3 into one automaton, including:
1) We combine all other interaction fragments except the interrupt combined fragments into one automaton, and all the automata corresponding to these interaction fragments are combined according to the relationships among the interaction fragments. Suppose that there are two automata A and B and all the events in the automaton A occur prior to all the events in the automaton B. Then we combine the two automata according to the following steps:
   11) The final state qa of the automaton A is combined with the initial state 1b of the automaton B, and the resulting state is marked as q.
   12) Any transition (l, e, qa) in the automaton A is transformed to (l, e, q), wherein l is a state in the automaton A and e is an event in the automaton A.
   13) Any transition (lb, e', l') in the automaton B is transformed to (q, e', l'), wherein l' is a state in the automaton B and e' is an event in the automaton B.
2) We combine the automata corresponding to the interrupt combined fragments into the automata generated in step 1). Any non-interrupt interaction fragment is regarded as an interaction fragment with a priority of 0, so any other interrupt fragment can interrupt the task execution of the non-interrupt interaction fragment. The steps of combining automata are as follows:
   21) A high-priority automaton is connected into a low-priority automaton according to a principle that a high-priority task interrupts a low-priority task. Provided that the priority of the automaton A is 1 and the priority of the automaton B is 2, a state of the automaton B can occur after any state of automaton A. q is an arbitrary state node of the automaton A; l0 is the initial state node of the automaton B; ln is the final state node of the automaton B. Then the new transitions

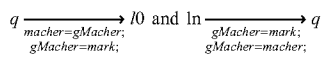

are added, where "mark" is used for recording a unique mark when entering a current interrupt and exiting the interrupt. "gMacher" is a global variable and used for recording a mark when entering the current interrupt, and "macher" is used for recording a matching mark before entering the interrupt. The transition q→l0 indicates that the matching mark before entering is stored by the macher when entering the high-priority automaton, and the gMacher records the matching mark of the a current transition. The guard of the transition ln→q indicates that the transition to state q can occur only when the matching marks are consistent, and the gMacher re-records the matching mark before entering the interrupt so as to be matched for use when exiting a prior interrupt. All the state nodes in the automaton A are applied to the same operation to obtain the combined automaton C.
   22) All the automata are connected as described in step 21) according to the principle that the high-priority automaton breaks the low-priority automaton to obtain a combined automaton;

Step 5: extracting the constraints of the interrupt sequence diagram, and adding the constraints to the converted automaton model, including:
1) For each common time constraint, we generate a clock variable c, and the clock variable c increases in time at any state node. A time constraint $e_y - e_x < a$ indicates that event $e_y$ must be completed within a time units after event $e_x$ occurs. For all event sequences, we set the clock variable c to 0 when the event $e_x$ occurs and add a conversion guard $c < a$ when the event $e_y$ occurs to indicate that the transition can happen and the automaton reaches the next state only when the condition is satisfied.
2) We generate a clock variable c for each project time constraint. A project time constraint $(e_y - e_x)\uparrow < a$ indicates $e_y$ must be completed within a $e_x$ occurs (the "a time units" excludes the running time of the interrupt tasks). A $e_y$, $e_x$ are positioned, but it remains unchanged at the other state nodes of the automaton. Similarly, we set $e_x$ occurs and pause the clock when an interrupt occurs because the rate of change of the clock variable c at other state nodes is 0. We restart the clock when the interrupt task ends and the current task execution sequence is restored, and we add a transition guard $c < e_y$ occurs to indicate that the transition can happen and the automaton reaches the next state only when the condition is satisfied.

Step 6, We extract the verification attribute in the interrupt sequence diagram and add the verification attribute as the constraints to the converted automaton model. We use the negation form of the expressions describing a task timeout attribute and a data consistency attribute and add the negative expressions into the automaton as the time constraints according to the method described in step 5.

Step 7, We convert the automata as the input format which can be processed by the automaton verification tool. Then we convert the information of the automaton obtained in step 6 into a file format acceptable to the verification tool.

The invention is advantageous in that:
1) The invention provides a conversion algorithm that converts an interrupt sequence diagram model to an automaton model. It can automatically convert an intuitive, visual and easy-to-understand interrupt sequence diagram model into a corresponding automaton model, and the constraint expressions are added as a clock variable to the automaton, which effectively expresses the real-time requirement of an interrupt-driven system. In this way, the cost of modeling and the probability of model error are reduced.
2) By combining the automaton obtained from the interrupt combined fragments and the automata obtained from interaction fragments outside the interrupt combined fragments, redundant transitions are effectively reduced to a great extent.
3) The problem of attribute verification of the interrupt-driven system is transformed the problem of determining the reachability of the node in the automaton by using the verification tool of the automaton model. The interrupt sequence diagram model is indirectly verified, so that the developers and designers receive assistance.
4) The interrupt sequence diagrams are used for modeling the interrupt-driven systems. Moreover, a method for converting the interrupt sequence diagram model into the corresponding automaton model is provided, and the interrupt sequence diagram model is indirectly verified by using the verification tool of the automaton model, hence the developers can conveniently model and verify the interrupt-driven systems.

DETAILED DESCRIPTION OF THE INVENTION

The detailed process of model conversion and model verification using this method is described below in conjunction with a simple interrupt sequence diagram model.

Figure 1:
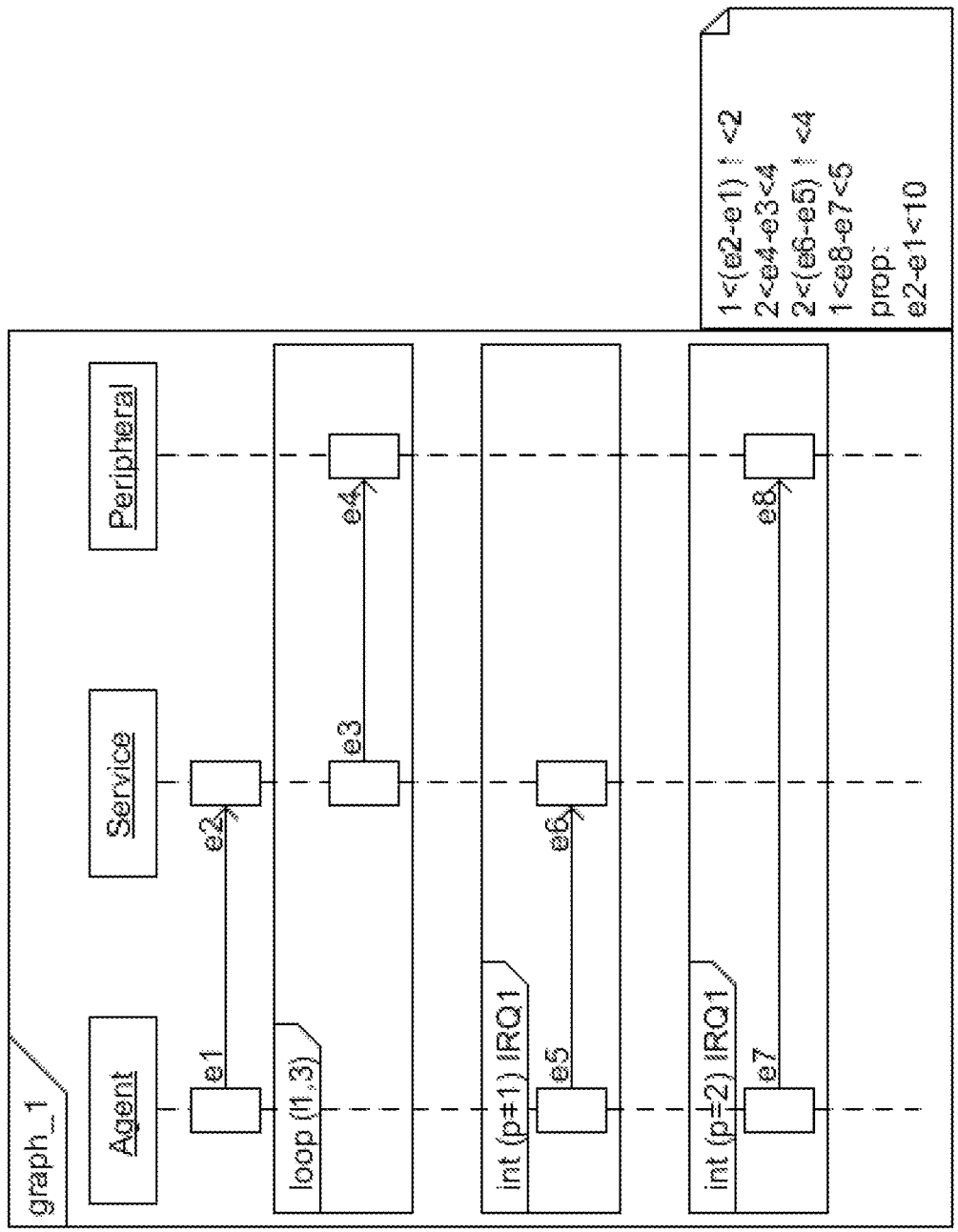
FIG. 1 is an interrupt sequence diagram according to an embodiment of the present invention.

A method for verifying an interrupt-driven system based on an interrupt sequence diagram in the embodiment is illustrated. 1) An interrupt sequence diagram model example introduced. This model is shown in FIG. 1, wherein:

11) Three interaction objects exist in the system: Agent, Service, and Peripheral objects.

12) Three combined interaction fragments exist in the system, including one loop combined fragment and two interrupt combined fragments IRQ 1 and IRQ 2, with priorities of 1 and 2, respectively. IRQ 1 is the interactions between the Agent and the Service, and IRQ 2 is the interactions between the Agent and the Peripheral.

13) Several constraints and verification attributes exist, including common time constraints and project time constraints.

2) The interaction fragments are divided into basic interaction fragments and combined interaction fragments according to step 2, and one basic interaction fragment and three combined interaction fragments (one loop combined interaction fragment and two interrupt combined interaction fragments) can be obtained as shown in FIG. 1.

Figure 2:
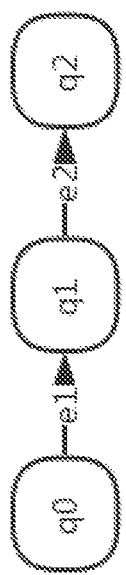
FIG. 2 is an automaton model generated from basic interaction fragments according to an embodiment of the present invention.

3) All the obtained interaction fragments are converted into the corresponding automaton models, wherein:

31) A quadruple of the basic interaction fragment in FIG. 1 is represented as follows: an interaction object set O={Agent, Service, Peripheral}, a message set M={e12,e34}, an event set E={e1,e2,e3, e4}, and a timing relationship of interaction events V={e1<e2,e2<e3,e3<e4}, so we get a set of trace of the basic interaction fragment T={e1→e2→e3→e4}. Firstly, the initial position q0 of the automaton is generated according to the first line of the algorithm, and the automaton generated at this time has only one non-final state q0, without any transition. After entering the loop of the second line, L is an empty set, which means a set of events occurring from the initial state q0 to a position q through several transitions. In line 4, E−L={e1,e2, e3,e4}. In line 5, we find all events e that have no predecessor events and are not in the set L of events that have occurred; in line 6, the corresponding position and transition are generated, when the state set of the automaton is {q0,q1}, the transition set thereof is {(q0,e1, q1)}; after continuous iteration until there is no new state node and transition added to the automaton, a last state node is marked as the final node, and the automaton obtained is shown in FIG. 2.

Figure 3:
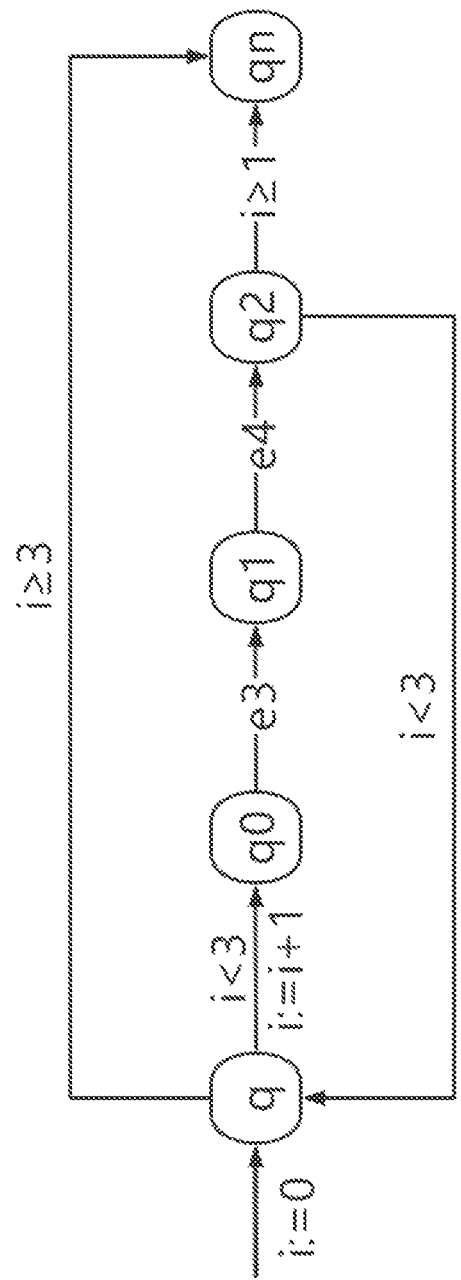
FIG. 3 is an automaton model generated from loop combined interaction fragments according to an embodiment of the present invention.

32) An automaton is generated with reference to the method for the basic interaction fragment within the loop combined fragments in composite combined fragments, and then new state nodes q and qn are generated, new $$\text{transitions} q \xrightarrow{i<3, i:=i+1} q0, q \xrightarrow{i\geq 3} qn, q2 \xrightarrow{i\geq 1} qn \text{ and } q2 \xrightarrow{i<3} q$$

are added, after this, q and qn are taken as new initial and final states, respectively, and the resulting automaton is shown in FIG. 3.

Figure 4:
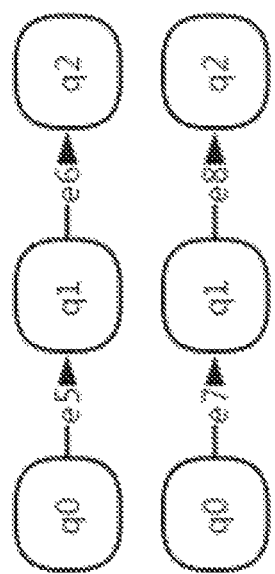
FIG. 4 is an automaton model generated from interrupt combined interaction fragments according to an embodiment of the present invention.

33) For the interrupt combined fragments, since there is no timing relationship between the interrupt interaction fragments and the interaction fragments outside the interrupt, we regard the interrupt combined fragments as a separate subsystem, and the resulting automaton is shown in FIG. 4.

Figure 5:
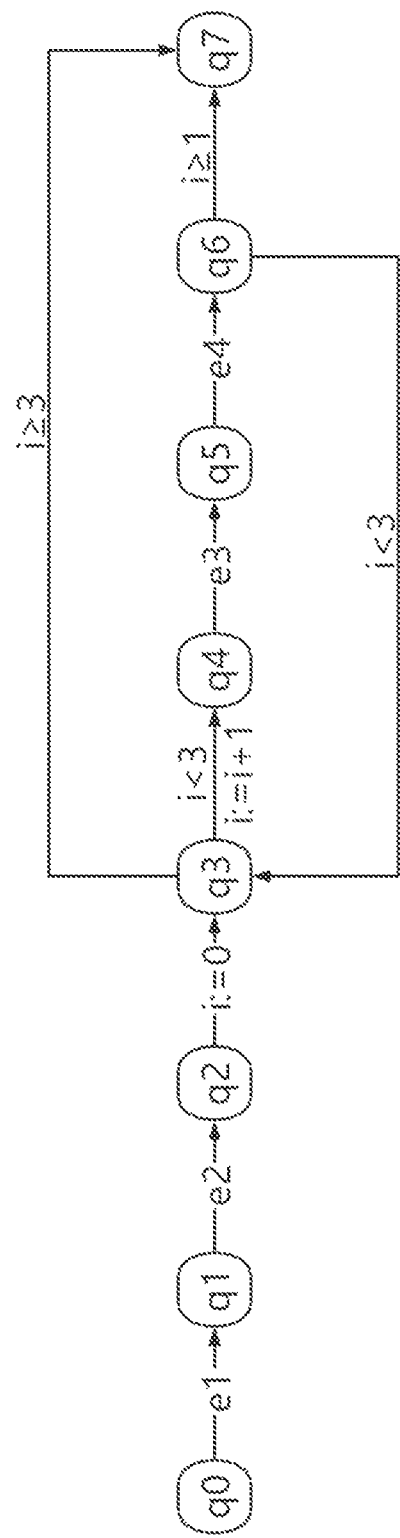
FIG. 5 is an automaton model generated from all interaction fragments other than interrupts according to an embodiment of the present invention.

4) All the obtained automata are combined into one automaton, wherein:

41) All the automata except the automaton generated from the interrupt interaction fragments are combined into one automaton according to the time sequence relationship firstly, the final state of the automata with anteriority in the time sequence relationship and the initial state of the automata with posteriority in the time sequence relationship are combined, and state variables in relevant transitions are modified to obtain a new automaton as shown in FIG. 5;

42) The interaction fragment described by the automaton obtained in 41) is regarded as an interaction fragment with a priority of 0; because the automaton with a high priority can break the automaton with a low priority at any state node, it is necessary to connect the automaton with the high priority into the automaton with the low priority and add the transition of entering and exiting the automaton with the high priority at all state nodes with the low priority; as a an example, if the interrupt IRQ1 occurs in state q1, then we need to add two new transitions $$q1 \xrightarrow[gMacher=1;]{macher=gMacher;} q8 \text{ and } q10 \xrightarrow[gMacher=macher;]{gMacher=1;} q1$$

Figure 6:
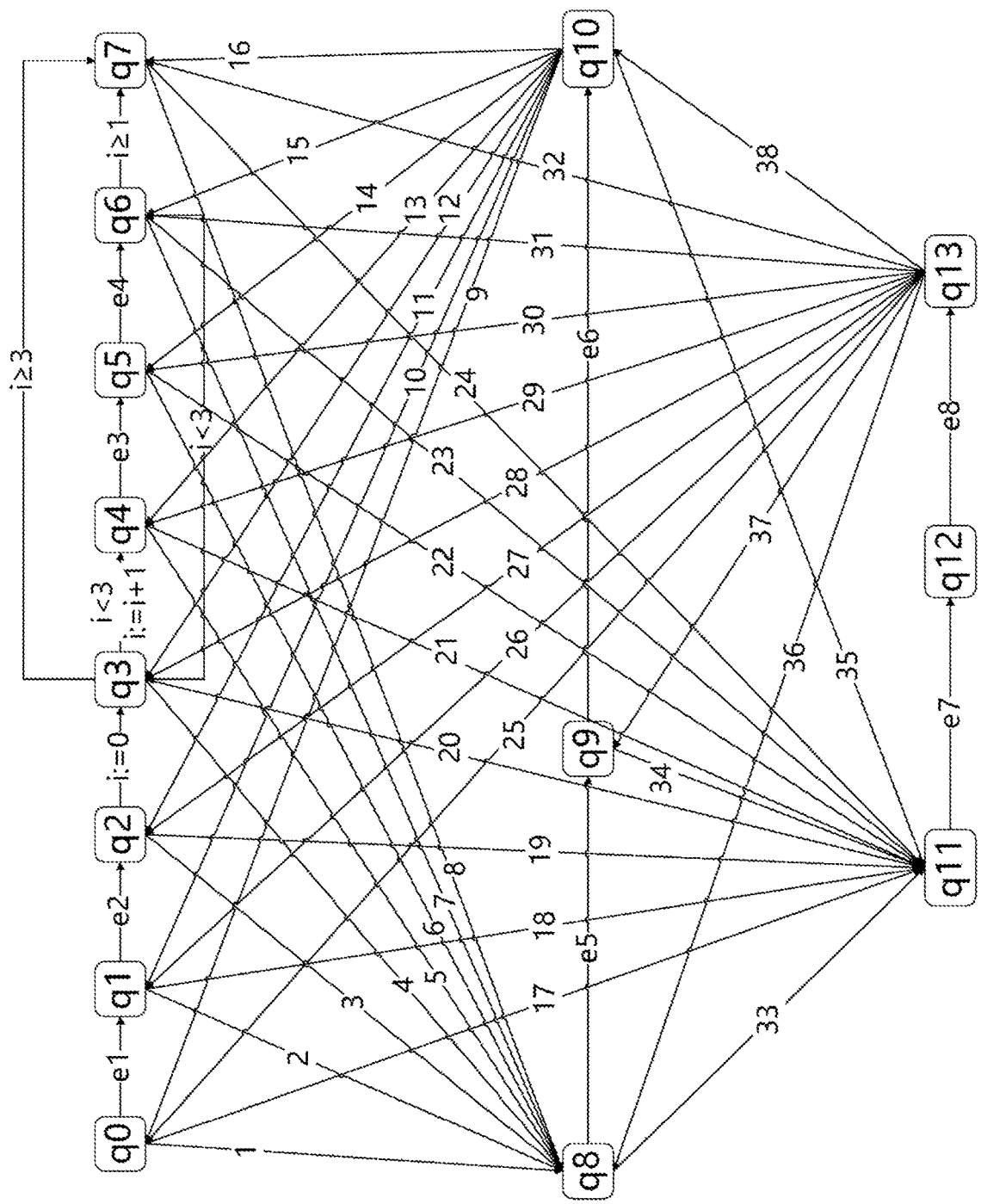
FIG. 6 is an automaton model with all interaction fragments combined according to an embodiment of the present invention.

(q8 and q10 are the initial and final states, respectively, of the interrupt IRQ1), where gMacher is used for recording a unique matching mark of incoming and outgoing edges thereof, and macher is used for recording a matching mark before entering the high priority automaton; this is done for all other state nodes, and similarly for IRQ2, it should be noted that IRQ2 can break not only the basic interaction fragment, but also IRQ1. The resulting automaton model is shown in FIG. 6, where the guards and assignments of the transition are as follows:

1: macher:=gMacher; gMacher:=0
2: macher:=gMacher; gMacher:=1
3: macher:=gMacher; gMacher:=2
4: macher:=gMacher; gMacher:=3
5: macher:=gMacher; gMacher:=4
6: macher:=gMacher; gMacher:=5
7: macher:=gMacher; gMacher:=6
8: macher:=gMacher; gMacher:=7
9: gMacher=0; gMacher:=macher
10: gMacher=1; gMacher:=macher
11: gMacher=2; gMacher:=macher
12: gMacher=3; gMacher:=macher
13: gMacher=4; gMacher:=macher
14: gMacher=5; gMacher:=macher
15: gMacher=6; gMacher:=macher
16: gMacher=7; gMacher:=macher
17: macher:=gMacher; gMacher:=0
18: macher: —gMacher; gMacher:=1
19: macher:=gMacher; gMacher:=2
20: macher:=gMacher; gMacher:=3
21: macher:=gMacher; gMacher:=4
22: macher:=gMacher; gMacher:=5
23: macher:=gMacher; gMacher:=6
24: macher:=gMacher; gMacher:=7
25: gMacher=0; gMacher:=macher
26: gMacher=1; gMacher:=macher
27: gMacher=2; gMacher:=macher
28: gMacher=3; gMacher:=macher
29: gMacher=4; gMacher:=macher
30: gMacher=5; gMacher:=macher
31: gMacher=6; gMacher:=macher
32: gMacher=7; gMacher:=macher
33: macher:=gMacher; gMacher:=0
34: macher:=gMacher; gMacher:=1
35: macher:=gMacher; gMacher:=2
36: gMacher=0; gMacher:=macher
37: gMacher=1; gMacher:=macher
38: gMacher=2; gMacher:=macher.

Figure 7:
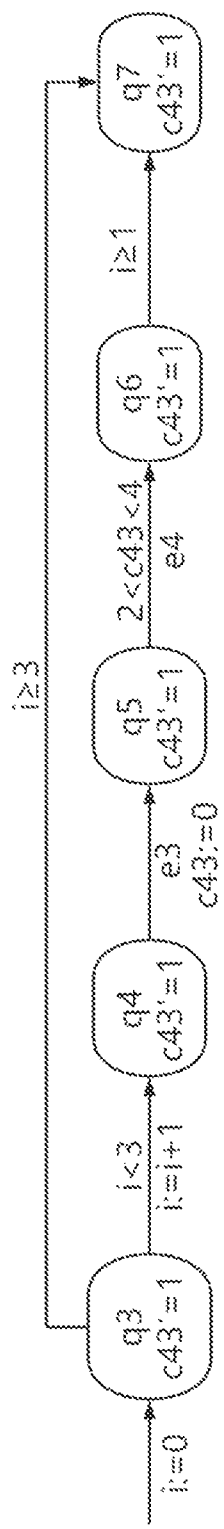
FIG. 7 is an automaton model with a common time constraint added as a clock variable according to an embodiment of the present invention.
Figure 8:
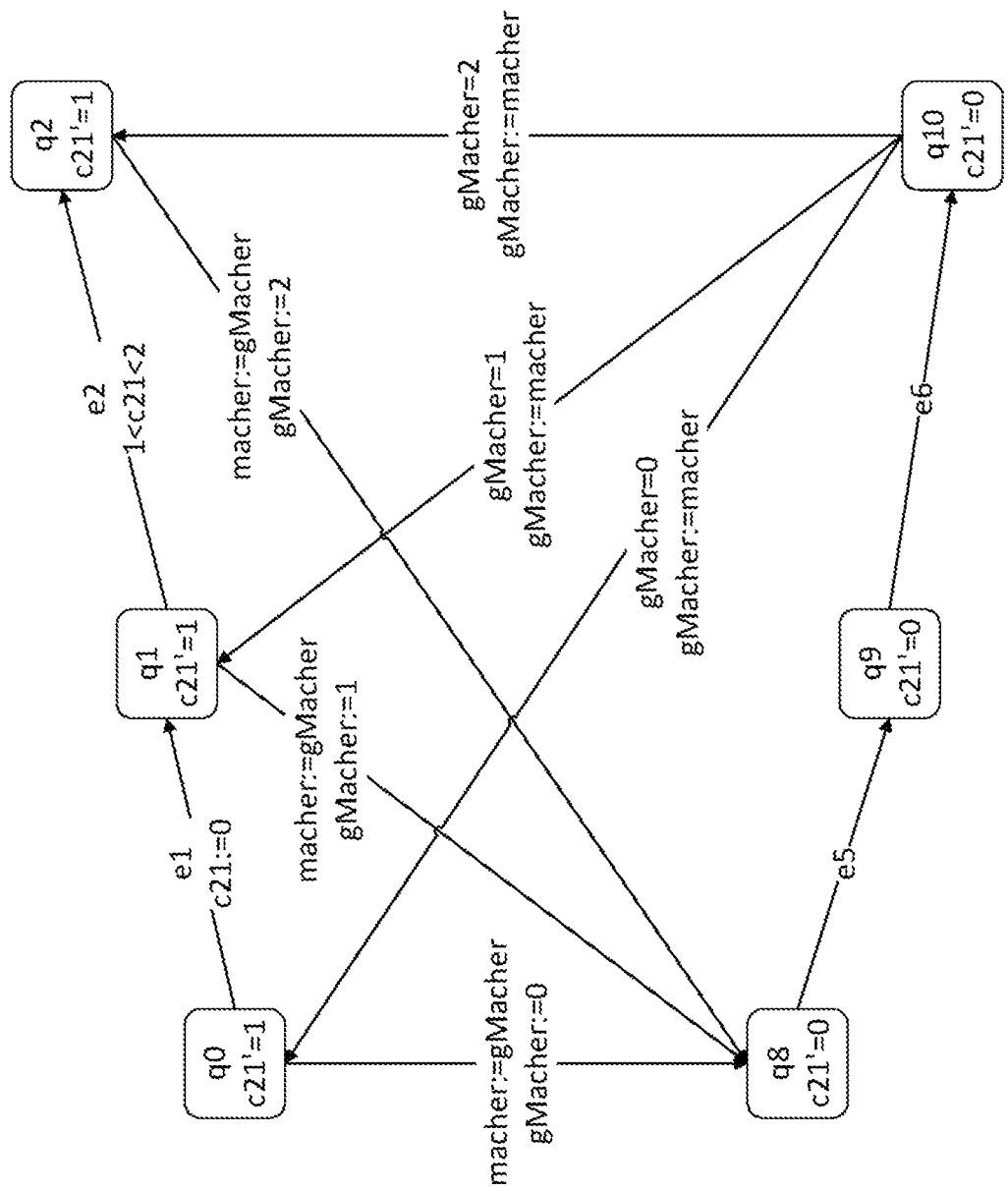
FIG. 8 is an automaton model with a project time constraint added as the clock variable according to an embodiment of the present invention.

5) Constraints of the interrupt sequence diagram are extracted and added to the converted automaton model, wherein:

51) For the common time constraint expression, we take $2<e4-e3<4$ as an example and set a clock variable $c43$, where a rate of change of the clock at all state nodes is 1; we find the transition where the event $e3$ occurs on the automaton model, initialize $c43$ to 0, add a guard $2<c43<4$ to the transition where the event $e4$ occurs, which indicates that the next state node can be reached through this transition only if the clock variable satisfies the guard, and the automaton model of this part is shown in FIG. 7; and 52) For the project time constraint expression, we take $1<(e2-e1)\uparrow<2$ as an example and set a clock variable $c21$, where a rate of change at all the state nodes of the automata where events $e2$ and $e1$ are occur is 1, and the rate of change at the state nodes of other automata is 0. Similarly, at the transition where event $e1$ occurs, $c21$ is initialized to 0, and the guard $1<e2-e1<2$ is added to the transition where event $e2$ occurs, indicating that the next state node can be reached through the transition only when the clock variable satisfies the guard; in this regard, we take IRQ1 to break the messaging between events $e2$ and $e1$ as an example, and the automaton model is shown in FIG. 8.

Figure 9:
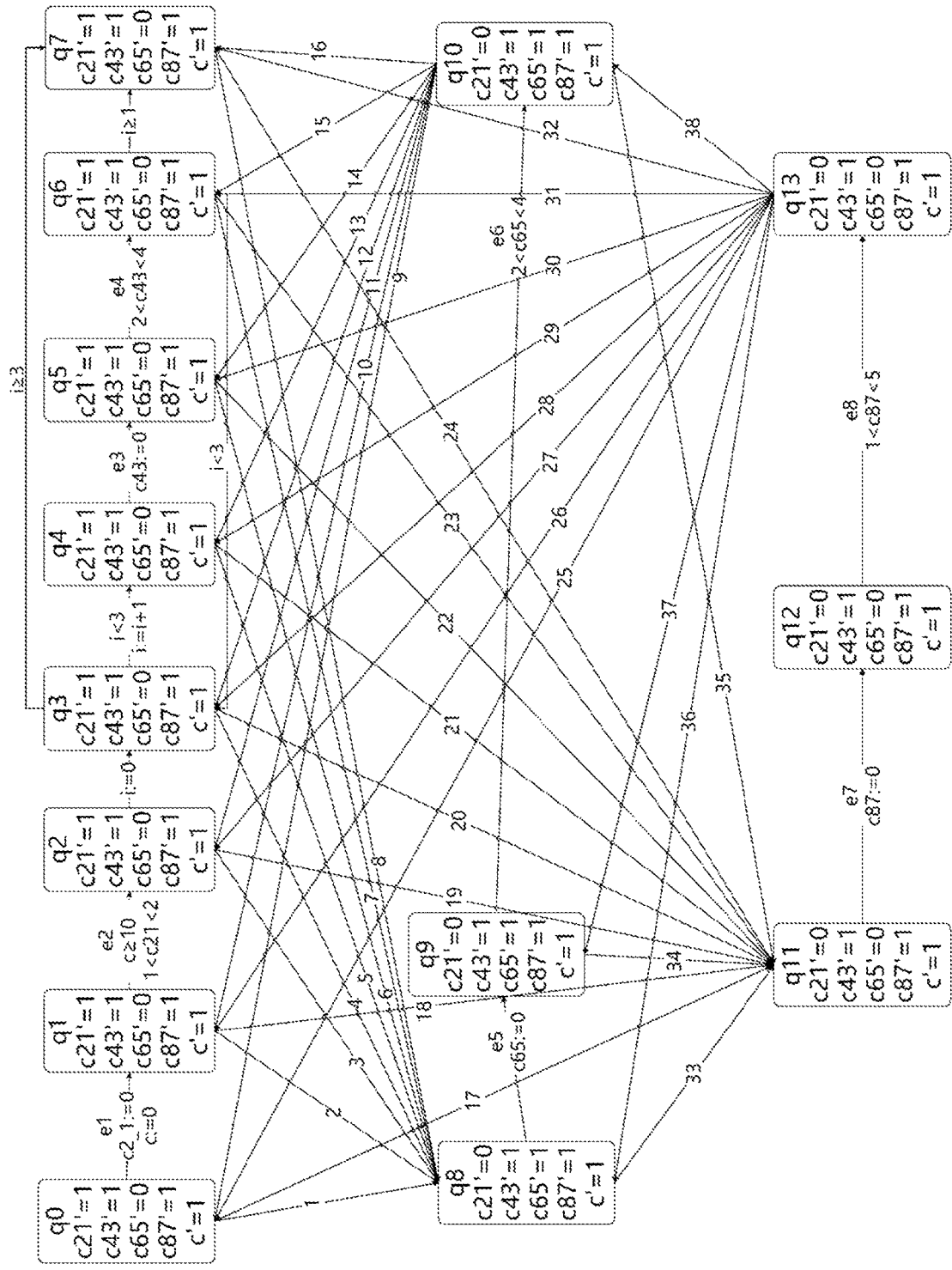
FIG. 9 is an automaton model converted from the model of FIG. 1.

6) Verification attribute information $e2-e1<10$ in the interrupt sequence diagram is extracted, we get the negation of the expression to obtain $e2-e1>=10$, which is added into an automaton model as a common time constraint, and a complete automaton model is finally generated, as shown in FIG. 9, wherein the guards and assignments of the transition are as follows:

1: macher:=gMacher; gMacher:=0
2: macher:=gMacher; gMacher:=1
3: macher:=gMacher; gMacher:=2
4: macher:=gMacher; gMacher:=3
5: macher:=gMacher; gMacher:=4
6: macher:=gMacher; gMacher:=5
7: macher:=gMacher; gMacher:=6
8: macher:=gMacher; gMacher:=7
9: gMacher=0; gMacher:=macher
10: gMacher=1; gMacher:=macher
11: gMacher=2; gMacher:=macher
12: gMacher=3; gMacher:=macher
13: gMacher=4; gMacher:=macher
14: gMacher=5; gMacher:=macher
15: gMacher=6; gMacher:=macher
16: gMacher=7; gMacher:=macher
17: macher:=gMacher; gMacher:=0
18: macher:=gMacher; gMacher:=1
19: macher:=gMacher; gMacher:=2
20: macher:=gMacher; gMacher:=3
21: macher:=gMacher; gMacher:=4
22: macher:=gMacher; gMacher:=5
23: macher:=gMacher; gMacher:=6
24: macher:=gMacher; gMacher:=7
25: gMacher=0; gMacher:=macher
26: gMacher=1; gMacher:=macher
27: gMacher=2; gMacher:=macher
28: gMacher=3; gMacher:=macher
29: gMacher=4; gMacher:=macher
30: gMacher=5; gMacher:=macher
31: gMacher=6; gMacher:=macher
32: gMacher=7; gMacher:=macher
33: macher:=gMacher; gMacher:=0
34: macher:=gMacher; gMacher:=1
35: macher:=gMacher; gMacher:=2
36: gMacher=0; gMacher:=macher
37: gMacher=1; gMacher:=macher
38: gMacher=2; gMacher:=macher.

7) The automaton is described as an input format acceptable to the automaton verification tool and verified in the automaton verification tool.

The foregoing is only a preferred embodiment of the present invention, and it should be noted that it will be apparent to those skilled in the art that various modifications and variations can be made in the present invention without departing from the spirit or scope of the invention.

The invention claimed is:

1. An interrupt-driven system verification method based on an interrupt sequence diagram, comprising the steps of:
Step 1, establishing an interrupt-driven system model based on an interrupt sequence diagram, wherein the interrupt sequence diagram is comprised of interaction objects, interaction fragments, constraints and verification attributes; providing that an interaction event within interrupt combined fragments and an event outside the interrupt combined fragments have no temporal partially-ordered relation because when interrupts may happen and get processed are uncertain; in terms of a priority of the interrupts, providing that execution of an interrupt fragment with a high priority can break execution of an interrupt with a low priority, but the execution of the interrupt with the low priority cannot break the execution of the interrupt with the high priority; in terms of a conditional expression, providing that if the conditional expression is true, then a interrupt task can be triggered, otherwise, the interrupt task cannot be triggered;

Step 2, dividing the interaction fragments in the interrupt sequence diagram obtained in step 1 into basic interaction fragments and composite interaction fragments;

Step 3, sequentially converting the basic interaction fragments and the composite interaction fragments into corresponding automaton models;

Step 4, combining the automaton models obtained in step 3 into one automaton model, whereby a converted automaton model from the interrupt-driven model is obtained;

Step 5, extracting the constraints in the interrupt sequence diagram, and adding the constraints to the converted automaton model;

Step 6, extracting the verification attribute in the interrupt sequence diagram, and adding the verification attribute as a constraint to the converted automaton model;

Step 7, describing an automaton as an input format acceptable to an automaton verification tool; and Step 8, verifying with the automaton verification tool, wherein the interrupt sequence diagram in step 1 is a two-dimensional diagram; the interaction objects are listed along the horizontal axis sequentially; the vertical axis indicates time increasing vertically downwards and is used for describing a time sequence of the interaction objects; the interaction objects are represented as lifelines, and the interaction among the objects is described as messages; the message is a communication mechanism among objects wherein a sending object sends a signal to another receiving object or several other receiving objects, an arrow is used for describing a transmission process of the message, a name of the message is marked above and below a line with the arrow, and sending and receiving events of the message have unique event names marked at a starting point and an ending point of the line with the arrow; a complex control flow in the interrupt sequence diagram is represented as combined fragments having their functions determined respectively by a type of interaction operations thereof, where "loop" represents a loop operation, "alt" represents an alternative operation, "opt" represents an optional operation, the same as in a UML sequence diagram; "int", however, is an additional operation of the interrupt sequence diagram to the UML sequence diagram, where a boundary of the combined fragments is also represented as a box, at an upper left corner of which a character string "int" indicates that the type of the combined fragments is an interrupt operation, p indicates the priority of the interrupt, id is a name of the interrupt combined fragments, and "condition" is a conditional expression indicating a condition under which an interrupt occurs.

2. The interrupt-driven system verification method based on an interrupt sequence diagram according to claim 1, wherein a method for converting the basic interaction fragments and the composite interaction fragments into corresponding automaton models in step 3 comprises the steps of:

1) For the basic interaction fragments, representing a basic interaction sequence as a quadruple BIS=(O, M, E, V), where O represents an interaction object set, M represents a message set, E represents an event set, and V represents a partial-ordered relationship among interaction events, obtaining a set T of traces of the interaction sequence on this basis, and then conducting conversion based on an algorithm, wherein:

firstly, an initial state q0 is generated, a set L is a set of events that occur during a plurality of transitions from the state q0 to a state q, events without precursor events or with precursor events in the set L are found out in the set E-L to generate new transitions and states, and each set is updated to continue iteration until no new transitions and states are generated anymore; identical state nodes in the set L are merged in the process of generating the automaton, as a result, a simplest automaton is generated; and 2) for the composite interaction fragments, generating a corresponding automaton based on the interaction sequence therein according to the method of converting the basic interaction fragments, wherein q0 is an initial state and qn is a final state, and completion of the generation of the automaton depends on to different types of the combined fragments, which is implemented as follows:

21) for loop combined fragments, there has to be at least a times and at most b times of loops, at first, two new position nodes q and qf are generated, meanwhile, a control variable i is generated and keeps unchanged at any state node, and then a transition $$q \xrightarrow{i<b, i:=i+1} q0, \ q \xrightarrow{i \geq b} qf$$

is generated, where a guard is used to limit the times of loops, and an assignment operation, i.e., i:=i+1, is used for recording how many times loops are executed and is incremented by 1 after each execution;

$$qn \xrightarrow{i \geq a} qf, \ qn \xrightarrow{i<b} q,$$

wherein a guard i≥a indicates that a state qf is open only after the loops are executed for times more than a, otherwise a transition back to state q takes place, and finally the position nodes q and qf are marked as new initial state and final state of the current automaton;

22) for optional combined fragments, to indicate whether a guard g is satisfied, a new position node q is first generated, and the new transitions $$q \xrightarrow{g} q0 \text{ and } q \xrightarrow{!g} qn$$

are added, wherein the interaction within the combined interaction fragments is executed only when the guard g is satisfied, otherwise a direct switch to a final state qn takes place, and finally q is marked as a new initial state of the current automaton;
23) for alternative combined fragments, to indicate whether the guard g is satisfied, a new position node is first generated, a new transition from the state q to the initial state of the generated automaton is added, wherein the interaction within the interaction fragment is executed when the guard g is satisfied, otherwise the interaction within another interaction fragment is executed, and finally q is marked as a new initial state of the current automaton;
24) for the interrupt combined fragments, the interaction events in the interrupt combined fragments and the interaction events outside the fragments are provided to have no time sequence relationship, the interrupt combined fragments are treated as an independent subsystem, and a corresponding automaton is generated based on the interaction fragments therein.

3. The interrupt-driven system verification method based on an interrupt sequence diagram according to claim 1, wherein
a method of combining a plurality of automata generated in step 3 into one automaton in step 4 comprises the steps of:
1) combining all other interaction fragments except the interrupt combined fragments into one automaton, where the automatons corresponding to these interaction fragments are combined according to and because of relationships among the interaction fragments, and for the automata A and B, all the events corresponding to the automaton A occur prior to all the events in the automaton B; the steps of combining are as follows:
   11) a final state qa of the automaton A is combined with an initial state lb of the automaton B, and a resulting state is marked as q;
   12) any transition (l, e, qa) in the automaton A is changed to (l, e, q), wherein l is a state in the automaton A, and e is an event in the automaton A; and
   13) any transition (lb, e', l') in the automaton B is changed to (q, e', l'), wherein l' is a state in the automaton B, and e' is an event in the automaton B; and
2) combining an automaton model corresponding to the interrupt combined fragments into the automaton generated in step 1); a non-interrupt interaction fragment is regarded as an interaction fragment with a priority of 0, any other interrupt can break a task execution of the non-interrupt interaction fragment, and the steps of combining are as follows:
   21) a high-priority automaton is connected into a low-priority automaton according to a principle that a high-priority task breaks a low-priority task; provided that the priority of automaton A is 1 and the priority of automaton B is 2, a state of the automaton B can occur after any state of automaton A; q is any state node of the automaton A, l0 is a initial state node of the automaton B, ln is an final state node of the automaton B, and the new transitions, i.e., $$q \xrightarrow[\substack{macher=gMacher; \\ gMacher=mark;}]{} l0 \text{ and } ln \xrightarrow[\substack{gMacher=mark; \\ gMacher=macher;}]{} q$$

are added, where "mark" is used for recording a unique mark when entering a current interrupt and exiting the interrupt, "gMacher" is a global variable and used for recording a mark when entering the current interrupt, and "macher" is used for recording a matching mark before entering the interrupt; the transition q→l0 indicates that the matching mark before entering is stored by the macher when entering the high-priority automaton, the gMacher records the matching mark of the a current transition, the guard of the transition ln→q indicates that the transition to state q can be possible only when the matching marks are consistent, and the gMacher re-records the matching mark before entering the interrupt so as to be matched for use when exiting a prior interrupt; all the state nodes in the automaton A are subjected to the same operation to obtain a combined automaton C; and
   22) all the automata are connected as described in step (21) according to the principle that the high-priority automaton breaks the low-priority automaton to obtain a combined automaton.

4. The interrupt-driven system verification method based on an interrupt sequence diagram according to claim 1, wherein
a method in step 5 of adding constraints to the automaton obtained in step 4 comprises the steps of:
1) generating a clock variable c for each common time constraint, and the clock variable c be capable of increasing in time at any state node; providing that the time constraint is $e_y e_x < a$ which indicates that event $e_y$ must be completed within a time units after event $e_x$ occurs; setting the clock variable c to be 0 for all event sequences when the event $e_x$ occurs, and adding a conversion guard $c < a$ when the event $e_y$ occurs to indicate that the transition can happen and the automaton reaches a next state only when the condition is satisfied; and
2) Generating a clock variable c for each project time constraint; indicating by a project time constraint $(e_y - e_x)\uparrow < a$ that the event $e_y$ must be completed within a time units after event $e_x$ occurs, the "a time units" excluding a running time of an interrupt task, wherein, at this time, the clock variable c increases in time at all the state nodes of the automaton where the events $e_y$ and $e_x$ are positioned, but remains unchanged at the other state nodes of the automaton; similarly, setting the clock variable c to be 0 for all event sequences when event $e_x$ occurs, pausing the clock when an interrupt occurs because a rate of change of the clock variable c at other state nodes is 0, restarting the clock when the interrupt task ends and a current task execution sequence is restored, and adding a transition guard $c < a$ when event $e_y$ occurs to indicate that the transition can happen and the automaton reaches a next state only when the condition is satisfied.

5. The interrupt-driven system verification method based on an interrupt sequence diagram according to claim 1, wherein
a method in the step 6 of adding the verification attribute into the automaton obtained in step 4 comprises, getting a negation of the expressions describing a task timeout attribute and a data consistency attribute, and adding the negative expressions into the automaton as time constraint expressions according to the method described in step 5 into the automaton.

6. The interrupt-driven system verification method based on an interrupt sequence diagram according to claim 1, wherein a method in step 7 of describing the automaton as an input format acceptable to the automaton verification tool comprises converting information of the automaton obtained in step 6 into a file format acceptable to the verification tool.

7. The interrupt-driven system verification method based on an interrupt sequence diagram according to claim 1, wherein a method for generating automata corresponding to different interaction fragments in the interrupt sequence diagram are provided firstly, which can be applicable to the verification of the interrupt-driven system.

8. The interrupt-driven system verification method based on an interrupt sequence diagram according to claim 1, wherein the interrupt sequence diagram is subjected to an overall analysis, the automata generated for different interaction fragments are combined into a complete automaton according to a strategy of combining in step 4, and constraints and the verification attribute are added into the automaton.

9. The interrupt-driven system verification method based on an interrupt sequence diagram according to claim 1, wherein the interrupt sequence diagram model is converted into a corresponding automaton model, and the interrupt sequence diagram model is indirectly verified with the verification tool of the automaton model, helping developers with modeling and verification.

* * * * *